(12) United States Patent
Shoda

(10) Patent No.: US 8,800,354 B2
(45) Date of Patent: Aug. 12, 2014

(54) IMPACT LOAD MONITORING SYSTEM AND IMPACT LOAD MONITORING METHOD FOR WIND TURBINE FOR WIND POWER GENERATION

(71) Applicant: Mitsubishi Heavy Industries, Ltd., Tokyo (JP)

(72) Inventor: Katsuhiko Shoda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/687,679

(22) Filed: Nov. 28, 2012

(65) Prior Publication Data

US 2013/0167624 A1    Jul. 4, 2013

(30) Foreign Application Priority Data

Dec. 28, 2011   (JP) .................................. 2011-290002

(51) Int. Cl.
*G01M 15/00*   (2006.01)

(52) U.S. Cl.
USPC ........................................................ 73/112.01

(58) Field of Classification Search
USPC ..................................................... 73/112.01
See application file for complete search history.

(56) References Cited

U.S. PATENT DOCUMENTS

| | | | |
|---|---|---|---|
| 8,021,110 B2 * | 9/2011 | Kerber ............................... | 416/1 |
| 8,039,981 B2 * | 10/2011 | Egedal et al. .................. | 290/44 |
| 8,255,173 B2 | 8/2012 | Fujioka et al. | |
| 8,319,364 B2 | 11/2012 | Nakayama | |
| 8,393,993 B2 | 3/2013 | Demtroeder | |
| 2008/0164091 A1 * | 7/2008 | Kerber .......................... | 181/211 |
| 2011/0285129 A1 * | 11/2011 | Li et al. ........................... | 290/44 |
| 2012/0010852 A1 * | 1/2012 | Winkelmann et al. ........ | 702/179 |
| 2012/0051888 A1 * | 3/2012 | Mizoue et al. ................ | 415/118 |
| 2012/0139740 A1 * | 6/2012 | Drossel et al. ................ | 340/658 |
| 2013/0261988 A1 * | 10/2013 | Lim et al. ........................ | 702/39 |

FOREIGN PATENT DOCUMENTS

| | | |
|---|---|---|
| JP | 2006-241981 A | 9/2006 |
| JP | 2006-342766 A | 12/2006 |
| JP | 2008-267272 A | 11/2008 |
| JP | 2009-524760 A | 7/2009 |
| JP | 2009-243428 A | 10/2009 |
| JP | 2010-079685 A | 4/2010 |
| JP | 2011-185632 A | 9/2011 |
| WO | 2010/122658 A1 | 10/2010 |

OTHER PUBLICATIONS

Japan Patent Office, "Office Action for JP 2011-290002," May 7, 2014.

* cited by examiner

*Primary Examiner* — Freddie Kirkland, III

(74) *Attorney, Agent, or Firm* — Manabu Kanesaka; Kenneth M. Berner; Benjamin J. Hauptman

(57) ABSTRACT

An impact load monitoring system for a wind turbine for wind power generation is provided with: an acceleration sensor 28 attached to a step-up gear 18 connected to a main shaft 20; a frequency filter 30 for extracting a monitoring-object component contained in a target frequency domain from vibration data representing a temporal change of amplitude of the acceleration obtained by the acceleration sensor 28; and a determination unit 32 for determining whether or not amplitude of acceleration of the monitoring-object component exceeds a reference value which is set in advance, by comparing the amplitude of the acceleration with the reference value.

18 Claims, 10 Drawing Sheets

FIG. 3
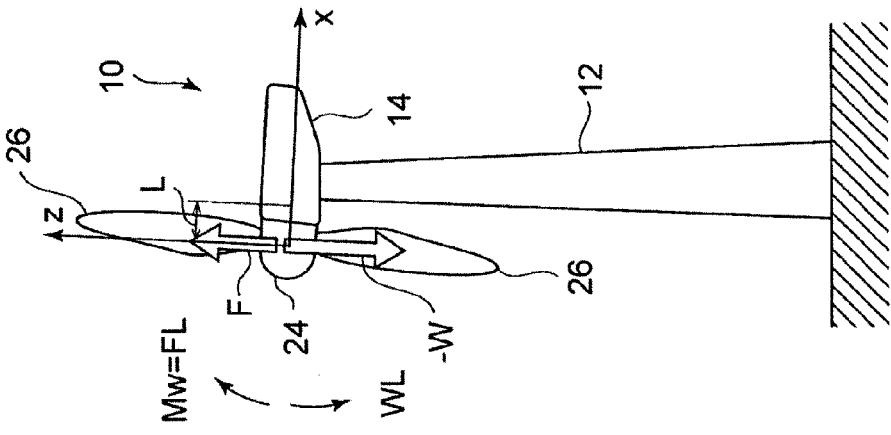
FIG. 3A
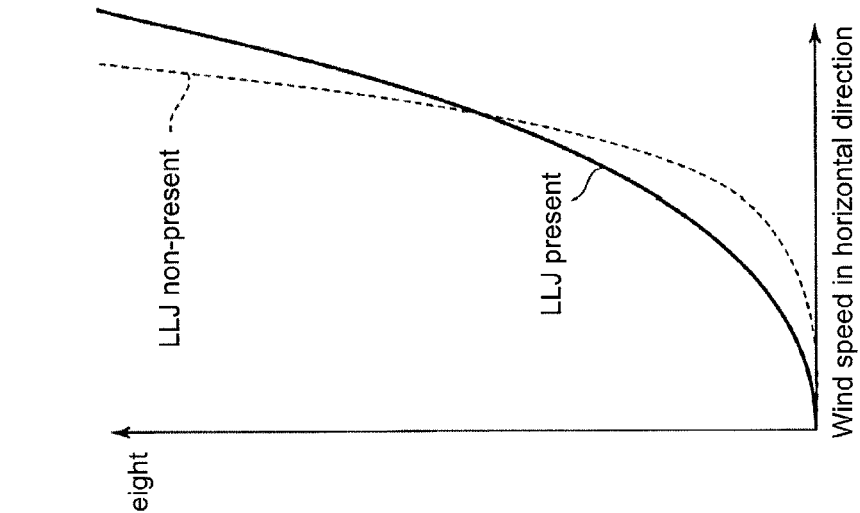
FIG. 3B
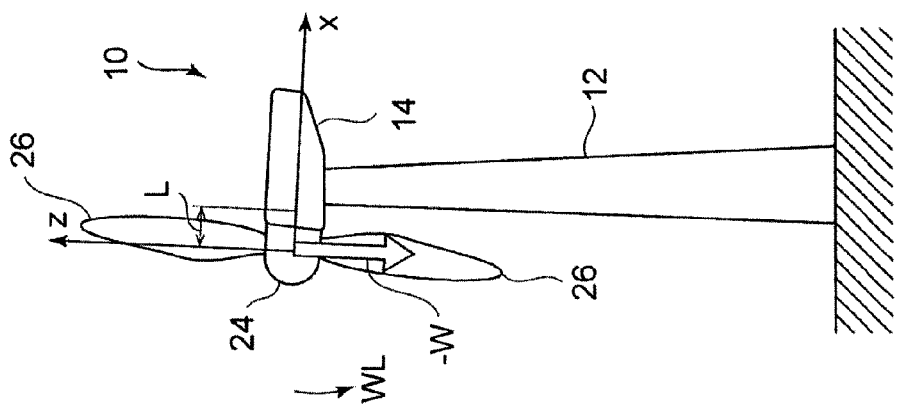
FIG. 3C

IMPACT LOAD MONITORING SYSTEM AND IMPACT LOAD MONITORING METHOD FOR WIND TURBINE FOR WIND POWER GENERATION

RELATED APPLICATIONS

The present application is based on, and claims priority from, Japanese Application No. JP2011-290002 filed Dec. 28, 2011, the disclosure of which is hereby incorporated by reference herein in its entirety.

TECHNICAL FIELD

The present invention relates to an impact load monitoring system and an impact load monitoring method for a wind turbine for wind power generation.

BACKGROUND ART

A wind turbine for wind power generation includes, for instance, a tower installed on the ground, a nacelle placed atop the tower, a rotor head rotatably attached to the nacelle, and a plurality of blades attached radially to the rotor head. The rotor head is connected to one end of a main shaft. The other end of the main shaft extends within the nacelle. The main shaft is rotatably supported by a main bearing provided in the nacelle. A step-up gear provided in the nacelle is connected to the other end of the main shaft and the step-up gear is connected to a generator. Upon rotation of the rotor head by wind against the blades, the rotational force is inputted to the generator via the main shaft and the step-up gear so as to generate power by the generator.

In the main bearing and the step-up gear, wear of slide surfaces could lead to generation of abnormalities. In view of this, Patent Literature 1 proposes an abnormality detecting apparatus for detecting abnormalities of bearings. This abnormality detecting apparatus includes a vibration sensor, a frequency analyzing part, a memory part and an abnormality detecting part. The frequency analyzing part analyzes a frequency of a vibration signal detected by the vibration sensor and detects a natural frequency. The memory part stores the detected natural frequency. More specifically, the vibration signal is converted to a Fourier spectrum by Fourier transformation and then, based on the Fourier spectrum, the natural frequency is detected. The abnormality detecting part detects abnormalities of the bearing based on change in the detected natural frequency.

CITATION LIST

Patent Literature

[PTL 1]
JP 2011-185632 A

SUMMARY

Technical Problem

In a region referred to as the Great Planes of the North American continent, a strong wind blowing at a low level ranging from 100 m to 150 m is known as Low Level Jet (hereinafter described as LLJ). When LLJ blows, significantly large gradient in the vertical direction is generated in the horizontal wind speed. More specifically, when LLF blows, a wind shear is generated in the horizontal wind speed within a height of the wind turbine. The wind speed becomes higher with distance from the ground.

Normally, the main shaft of the wind turbine for wind power generation is subjected to a downward moment (weight moment) with the main bearing as a fulcrum. The weight moment acts to push the main shaft downward with respect to the main bearing and thus the main shaft bearing rotates in a stable manner.

However, due to the wind sheer generated by the LLJ, energy of the wind blowing against upper blades is greater than energy of the wind blowing against lower blades. Thus, an upward moment (wind moment) acts on the rotor head side of the main shaft.

The wind moment acts to incline the main shaft momentarily against the weight moment so as to lift the rotor head side of the main shaft. After this, the wind moment decreases and the rotor head side of the main shaft drops to the original position.

When the rotor head side of the main shaft drops, an impact load is added to peripheral devices around the main shaft, such as the main bearing supporting the main shaft and the step-up gear connected to the main shaft. Being repeatedly subjected to the impact load, the main bearing and gears of the step-up gear are at risk of damage. Therefore, it is important to monitor the impact load on the peripheral devices around the main shaft.

However, it was known that the peripheral devices around the main shaft is subjected to the impact load due to the wind shear and thus there is not yet established an effective method for monitoring the impact load. For instance, even if the above abnormality detecting apparatus of the related art is applied to monitor the impact load, it is difficult to monitor such a transitional phenomenon as the impact load. This is due to the fact that the impact load is expressed on a time axis as a δ function whereas the impact load is expressed on a frequency axis as a constant containing every frequency component and does not cause any change in the natural frequency of the peripheral devices.

In view of the above issues, it is an object of the present invention to provide an impact load monitoring system and an impact load monitoring method for a wind turbine for wind power generation, which are capable of monitoring the load impact acting on the peripheral device around the main shaft of the wind turbine.

Solution to Problem

According to embodiments, an impact load monitoring system for a wind turbine for wind power generation, comprise:

an acceleration sensor attached to a peripheral device around a main shaft of the wind turbine;

a frequency filter for extracting a monitoring-object component contained in a target frequency domain from vibration data, the vibration data representing a temporal change of amplitude of acceleration obtained by the acceleration sensor; and a determination unit for determining whether or not the amplitude of the acceleration of the monitoring object component exceeds a reference value which is set in advance, by comparing the amplitude of the acceleration with the reference value.

According to the above impact load monitoring system for the wind turbine, the monitoring-object component is extracted by the frequency filter from vibration data, and the amplitude of the acceleration is compared by the determination unit with the reference value.

The impact load contains every frequency component on a frequency axis and thus, natural vibration of the peripheral device is temporarily induced by the impact load. Due to this, the amplitude of the acceleration of the natural vibration increases temporarily.

Therefore, the load impact monitoring system for the wind turbine for wind power generation extracts the monitoring-object component regarding the natural vibration from the vibration data by means of the frequency filter, after removing a noise component, monitors the amplitude of the acceleration of the monitoring-object component so as to monitor the amplitude of the acceleration of the natural vibration. According to this impact load monitoring system for the wind turbine for wind power generation, it is possible to determine that the impact load is applied on the peripheral device when the amplitude of the acceleration of the monitoring-object component exceeds the reference value.

In this manner, according to this impact load monitoring system for the wind turbine for wind power generation, it is possible to determine whether or not the impact load is applied on the peripheral device around the main shaft and thus appropriate actions can be taken in accordance with the determination result.

According to at least one embodiment, the target frequency domain is not greater than 200 Hz.

The target frequency of main peripheral devices is in a range not greater than 200 Hz. Thus, with the above structure, it is possible to determine whether or not the impact load is applied on the main peripheral devices and appropriate actions can be taken in accordance with the determination result.

According to at least one embodiment, the acceleration sensor is attached to a step-up gear connected to the main shaft.

According to this structure, it is possible to determine whether or not the impact load is applied on the step-up gear and appropriate actions can be taken in accordance with the determination result.

According to at least one embodiment, the acceleration sensor is attached to a main bearing supporting the main shaft.

According to this structure, it is possible to determine whether or not the impact load is applied on the main bearing and appropriate actions can be taken in accordance with the determination result.

According to at least one embodiment, the determination unit calculates a cumulative frequency of the impact load by integrating the number of times that the amplitude of the acceleration exceeds the reference value and outputs the cumulative frequency.

According to this structure, appropriate actions can be taken in accordance with the cumulative frequency.

According to embodiments, an impact load monitoring method for a wind turbine for wind power generation comprises steps of:

attaching an acceleration sensor to a peripheral mechanism around a main shaft of the wind turbine;

extracting a monitoring-object component contained in target frequency domain from vibration data, the vibration data representing a temporal change of amplitude of acceleration obtained by the acceleration sensor; and determining whether or not amplitude of acceleration of the monitoring-object component exceeds a reference value which is set in advance, by comparing the amplitude of the acceleration with the reference value.

According to the above impact load monitoring method, the monitoring-object component is extracted from vibration data, and the amplitude of the acceleration is compared with the reference value.

The impact load contains every frequency component on a frequency axis and thus, natural vibration of the peripheral device is temporarily induced by the impact load. Due to this, the amplitude of the acceleration of the natural vibration increases temporarily.

Therefore, the load impact monitoring method for the wind turbine for wind power generation extracts the monitoring-object component regarding the natural vibration from the vibration data, after removing a noise component, monitors the amplitude of the acceleration of the monitoring-object component so as to monitor the amplitude of the acceleration of the natural vibration. According to this impact load monitoring method for the wind turbine for wind power generation, it is possible to determine that the impact load is applied on the peripheral device when the amplitude of the acceleration of the monitoring-object component exceeds the reference value.

In this manner, according to this impact load monitoring method for the wind turbine for wind power generation, it is possible to determine using a simple structure whether or not the impact load is applied on the peripheral device around the main shaft and thus appropriate actions can be taken in accordance with the determination result.

Advantageous Effects

According to embodiments of the present invention, it is possible to provide an impact load monitoring system and an impact load monitoring method for a wind turbine for wind power generation, which are capable of monitoring the load impact applied on a peripheral device around a main shaft of the wind turbine.

BRIEF DESCRIPTION OF DRAWINGS

FIG. 1 is a schematic illustration of a wind turbine for wind power generation to which an impact load monitoring system of a first embodiment of the present invention is applied.

FIG. 2 is a schematic illustration of the impact load monitoring system of the first embodiment that is applied to the wind turbine for wind power generation of FIG. 1.

[FIG. 3]

FIG. 3A shows moment acting on a rotor-head side of the main shaft in a LLJ non-present state when there is no LLJ. FIG. 3B is a graph representing a vertical distribution of a horizontal wind speed in both the LLJ present state and the LLJ non-present state. FIG. 3C shows moment acting on the rotor-head side of the main shaft in a LLJ present state when there is LLJ.

FIG. 4A is a graph schematically showing a temporal change of the moment acting on the rotor-head side of the main shaft in the LLJ non-present state.

FIG. 4b is a graph schematically showing a temporal change of the moment acting on the rotor-head side of the main shaft in the LLJ present state.

FIG. 5A is an illustration of the state where the rotor-head side of the main shaft is lifted by a wind moment.

FIG. 5B is an illustration of the state where the rotor-head side of the main shaft drops from the state illustrated in FIG. 5A.

FIG. 6 is a graph schematically showing a temporal change of a force when the impact load is generated.

FIG. 7A is a graph schematically showing a signal (a δ function) when an acceleration sensor detects the impact load of FIG. 6 alone.

FIG. 7B is a graph schematically showing Fourier spectrum in correspondence with the δ function.

FIG. 8A is a graph schematically showing vibration data outputted by the acceleration sensor.

FIG. 8B is a graph schematically showing a monitoring-object component outputted by a frequency filter.

FIG. 9 is a graph showing results of counting the number of times per year when amplitude of acceleration of the monitoring-object exceeds a reference value.

FIG. 10 is a schematic illustration of the impact load monitoring system of a second embodiment.

FIG. 11A is a graph showing the number of times when the acceleration exceeds the reference value per day or month as a modified example of an output of a determination unit.

FIG. 11B is a graph showing a maximum acceleration of the monitoring-object component per day or month.

DETAILED DESCRIPTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

First Embodiment

Figure 1:
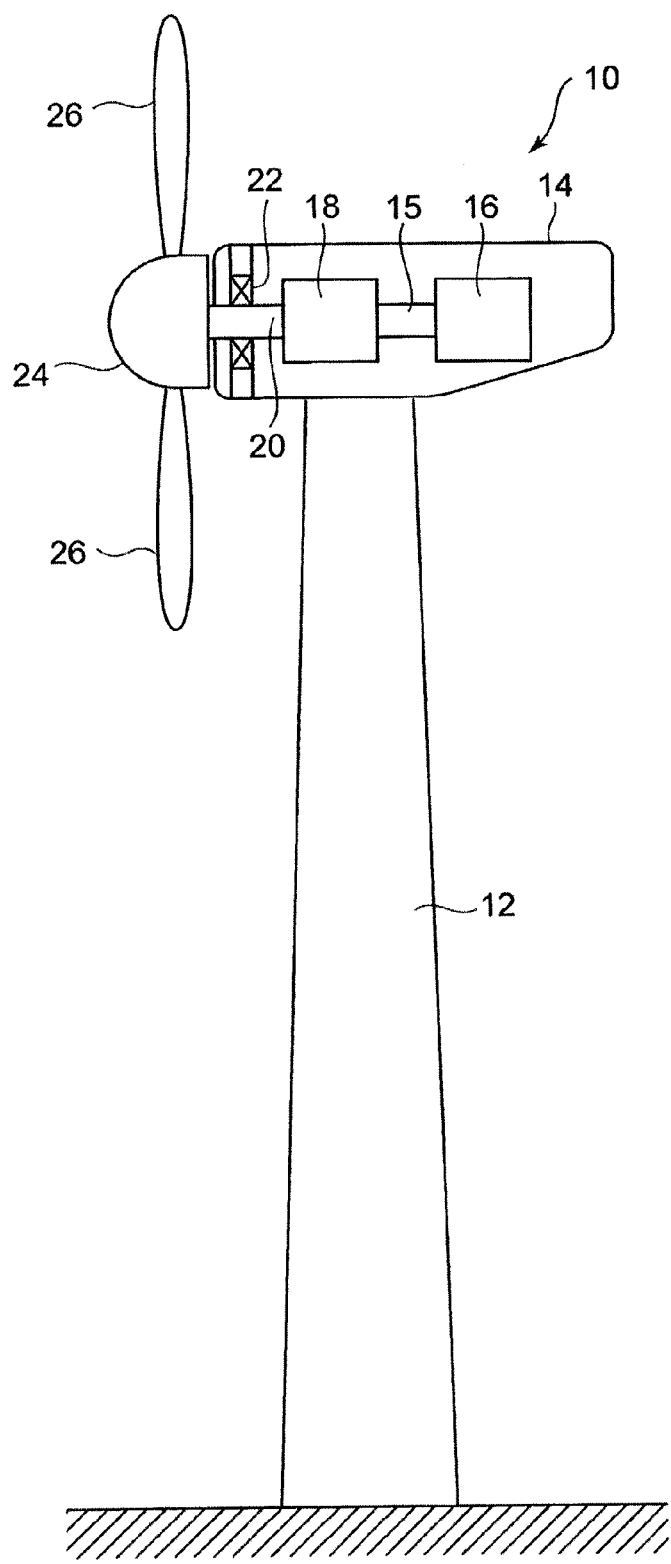
[FIG. 1]
Figure 2:
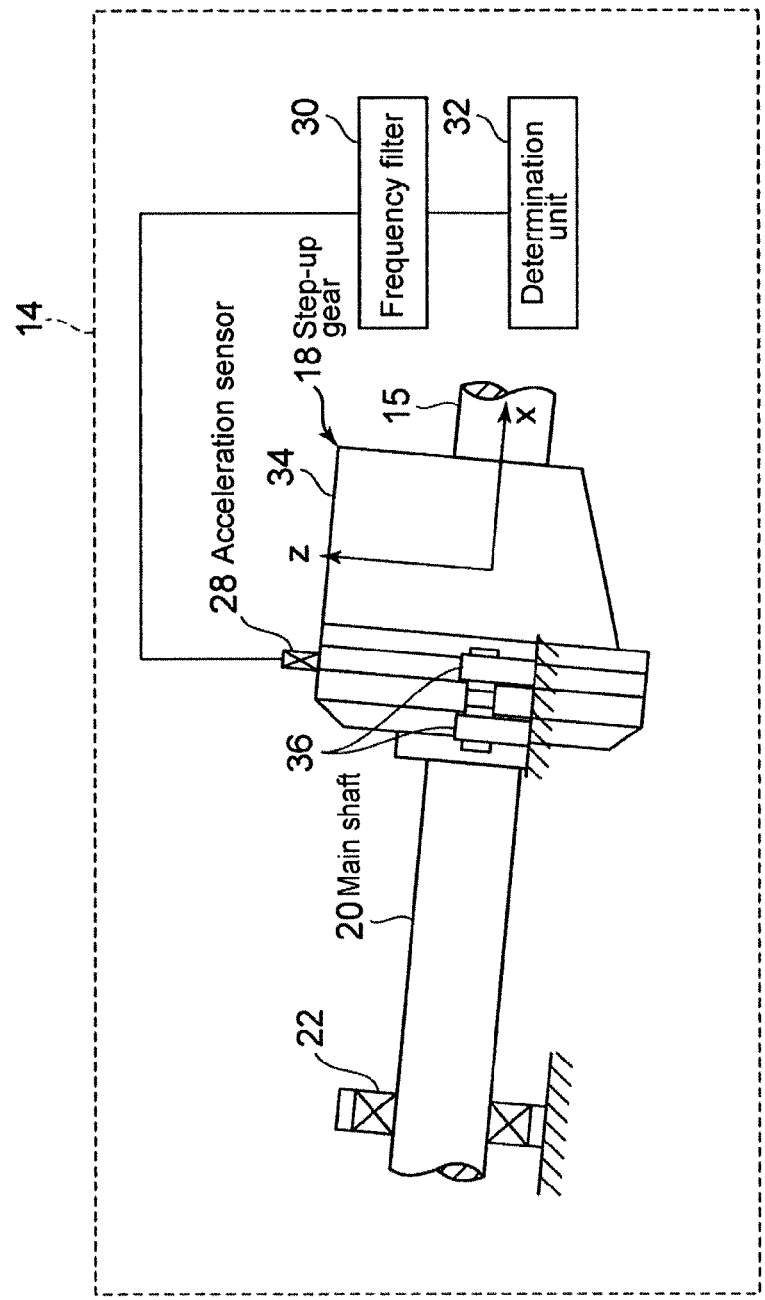
[FIG. 2]

FIG. 1 is a schematic illustration of a wind turbine for wind power generation 10. The wind turbine for wind power generation 10 is provided with a tower 12 installed on the ground, for instance. A nacelle 14 is installed on the tower 12. A generator 16 and a step-up gear 18 are installed in the nacelle 14. The generator 16 and the step-up gear 18 are connected to each other via a shaft 15. A main shaft 20 is connected to the step-up gear 18 at one end. The step-up gear 18 is formed of, for instance, a planetary gear mechanism.

A main shaft bearing 22 is provided in the nacelle 14 to support the main shaft 20 rotatably. The main shaft 20 extends almost horizontally and a front-end side of the main shaft 20 protrudes from the nacelle 14.

At the end of the main shaft 20, a rotor head 24 is fixed. To the rotor head 24, blades (e.g. three blades in the drawing) are radially attached. More specifically, this wind turbine for wind power generation 10 is a propeller windmill of a horizontal-axis lift type.

In the wind turbine for wind power generation 10, once the blade 26 receives the wind in the horizontal direction, the rotor head 24 rotates. The rotation force of the rotor head 24 is inputted to the generator 16 via the main shaft 20, the step-up gear 18 and the shaft 15. As a result, the generator 16 generates power.

[An Impact Load Monitoring System for the Wind Turbine for Wind Power Generation]

The impact load monitoring system of the first embodiment that is applied to the wind turbine for wind power generation 10 includes an acceleration sensor (an acceleration pickup) 28, a frequency filter 30, and a determination unit 32 that are arranged in the nacelle 14. However, the installation location of the frequency filter 30 and the determination unit 32 is not limited and the frequency filter 30 and the determination unit 32 may be placed outside the nacelle 14.

The step-up gear includes a housing 34. The housing 34 is fixed to the nacelle 14 by a torque arm block 36 so as not to rotate relative to the nacelle 14. The acceleration sensor 28 is attached to the housing 34 of the step-up gear 18 to measure and output the vibration data of the housing 34 of the step-up gear 18. The vibration data is time-series data representing temporal change of amplitude of acceleration. The acceleration sensor 28 continuously measures the acceleration and outputs the measured acceleration. For instance, a sampling frequency of the acceleration sensor 28 is 2 kHz.

An input terminal of the frequency filter 30 is electrically connected to an output terminal of the acceleration sensor 28 so that the vibration data is inputted from the acceleration sensor 28 to the frequency filter 30. The frequency filter 30 allows only a component (a monitoring-object component) contained in a target frequency domain from the inputted vibration data to pass through and then output. More specifically, the frequency filter 30 removes a low frequency component and a high frequency component outside the target frequency domain of the monitoring object.

Further, the target frequency domain is in a range from 0 Hz to 200 Hz and preferably in a range from 50 Hz to 100 Hz. In the case of defining an upper limit alone as the target frequency domain, a low-pass filter may be used as the frequency filter 30. In contrast, in the case of defining the upper limit and a lower limit, a bandpass filter may be used as the frequency filter 30.

An output terminal of the frequency filter 30 is electrically connected to an input terminal of the determination unit 32. The determination unit 32 is constituted of, for instance, a computer including a calculation unit, a memory unit and an input-output unit. To the determination unit 32, the monitoring-object component of the vibration data is inputted from the frequency filter 30. Further, the determination unit 32 may be configured integrally with the frequency filter 30.

The determination unit 32 determines whether or not the amplitude of the acceleration of the monitoring-object component exceeds a reference value that is set in advance, by comparing the amplitude of the acceleration with the reference value. The reference value is set, for instance, to 0.5 G (m/s$^2$).

Further, the determination unit 32 may count the number of times per year that the amplitude of the acceleration exceeds the reference value and outputs the frequency (the number of times) as an annual cumulative frequency of the impact load. The output of the determination unit 32 is sent to a control center of the wind turbine 10 via a communication line, for instance.

The function of the impact load monitoring system according to the first embodiment is described below.

FIG. 3 is an explanatory diagram of a generation mechanism of an impact load in the wind turbine 10. FIG. 3A shows a direction of a self-weight moment (W·L) in a LLJ non-present state when there is no LLJ. FIG. 3C shows directions of the self-weight moment and a wind moment Mw(=F·L) in a LLJ present state when there is LLJ. FIG. 3B is a graph representing a vertical distribution of a horizontal wind speed in both the LLJ present state and the LLJ non-present state.

As shown in FIG. 3B, when LLJ is blowing, larger gradient in the vertical direction is generated in the horizontal wind speed than when LLJ is not blowing. More specifically, this generates a difference in the horizontal wind speed, resulting in generation of the wind shear. It is known that generation of the wind shear is not detectable by a simple anemometer attached to the wind turbine for wind power generation 10.

Upon generation of the wind shear, energy of the wind blowing against the upper blade 26 becomes larger than energy of the wind blowing against the lower blade 26. As a result, an upward force F is generated acting to lift the rotor-head side of the main shaft 20 and the upward wind moment Mw acts momentarily.

Further, L represents a distance between the center of gravity of the rotor head 24 and the main shaft bearing 22 and the wind moment Mw is proportionate to an integrated value calculated by integrating in the height direction, density ρ, the square of the wind speed v (z), and the height direction position z, as shown in the following formula (1).

$$Mw \propto \int_0^h \rho \cdot v(z)^2 \cdot z \cdot dz$$ [Formula 1]

Figure 4A:
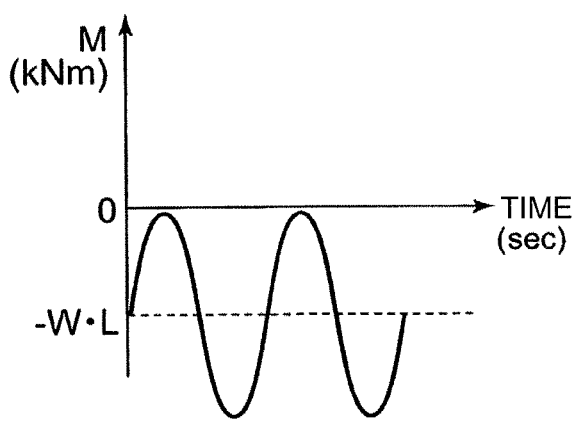
[FIG. 4A]
Figure 4B:
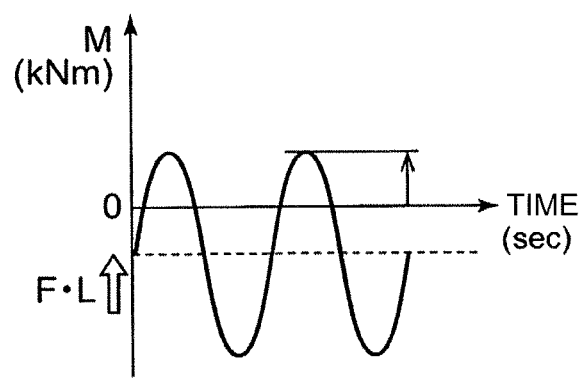
[FIG. 4B]

FIG. 4A is a graph schematically showing a temporal change of the moment M acting on the rotor-head 24 side of the main shaft 20 in the LLJ non-present state. FIG. 4b is a graph schematically showing a temporal change of the moment M acting on the rotor-head 24 side of the main shaft 20 in the LLJ present state. When there is no wind shear generated in the LLJ non-present state as shown in FIG. 4A, the moment M changes about the self-weight moment WL caused by the self-weight W and is always downward not greater than zero. In contrast, when the wind shear is generated in the LLJ present state as shown in FIG. 4B, the moment M increases in corresponding with the wind moment Mw and becomes greater than zero temporarily.

Figure 5A:
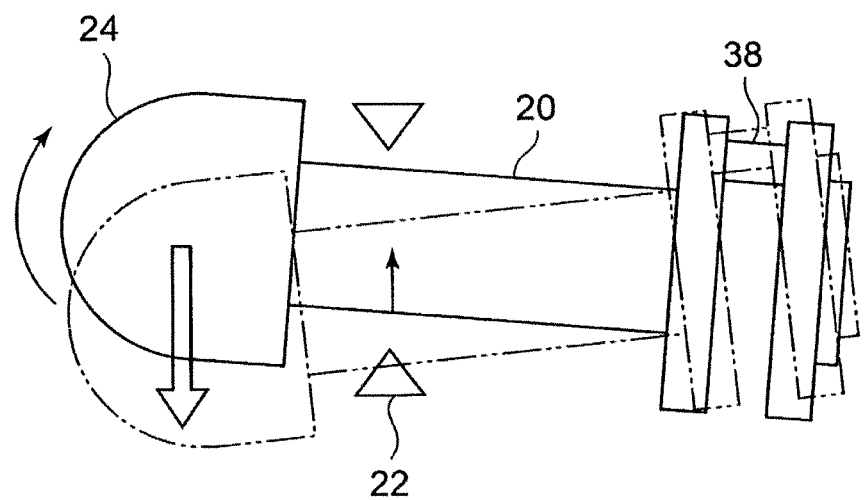
[FIG. 5A]
Figure 5B:
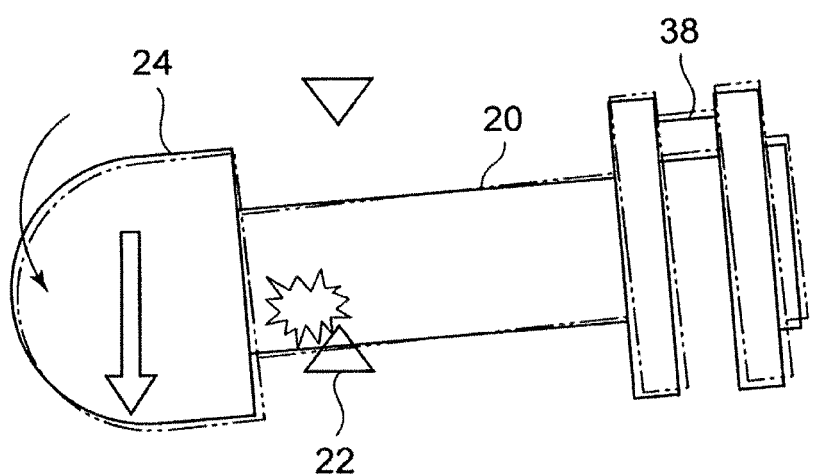
[FIG. 5B]

FIG. 5A is a schematic illustration of the state where the rotor-head 24 side of the main shaft 20 is lifted by the upward moment M. FIG. 5B is a schematic illustration of the state where the rotor-head 24 side of the main shaft 20 drops from the state illustrated in FIG. 5A. As shown in FIG. 5A, when the rotor-head 24 side of the main shaft 20 is lifted, the main shaft 20 is lifted within a dimensional tolerance in the main bearing 22. Alternatively, a planetary carrier 38 on the main shaft 20 side of the step-up gear 18 and a planetary gear supported by the planetary carrier 38 are lifted within a dimensional tolerance in a ring gear.

Then, when the front-end side of the main shaft 20 drops as shown in FIG. 5B, The main shaft 20 collides against the main bearing 22, thereby applying the impact load. Further, in the step-up gear, the planetary gear collides against the ring gear, applying the impact load.

Figure 6:
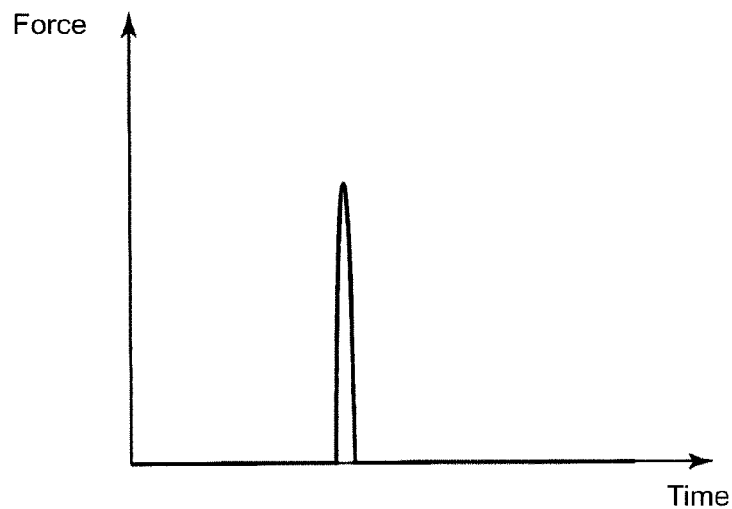
[FIG. 6]
Figure 7A:
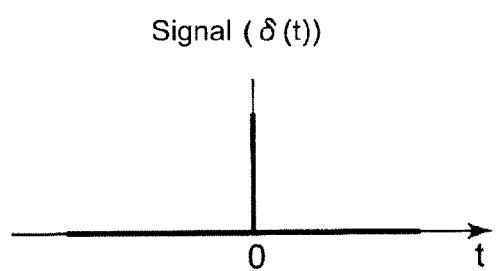
[FIG. 7A]
Figure 7B:
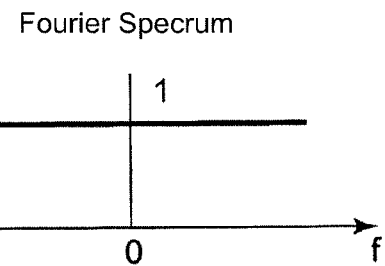
[FIG. 7B]

According to the impact load, as shown in FIG. 6, the main bearing 22 and the step-up gear 18 are temporarily subjected to the force. In the case where the impact load of this type is detected solely by the acceleration sensor 28, the output signal of the acceleration sensor 28 becomes the δ function as shown in FIG. 7A. Moreover, in the case where the δ function is converted by Fourier transformation, the obtained Fourier spectrum is a constant in every frequency component as shown in FIG. 7B.

Therefore, when the impact load is applied, the natural frequency of the peripheral device around the main shaft 20 does not change but natural vibration is temporarily induced.

Therefore, in the impact load monitoring system of the first embodiment monitors excitation of the natural vibration to determine whether or not the impact load is applied on the peripheral device.

Figure 8A:
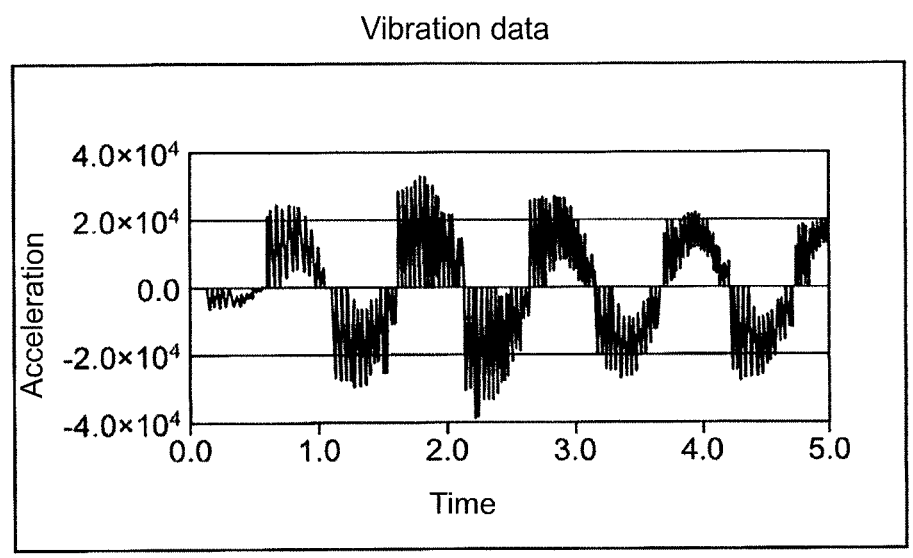
[FIG. 8A]
Figure 8B:
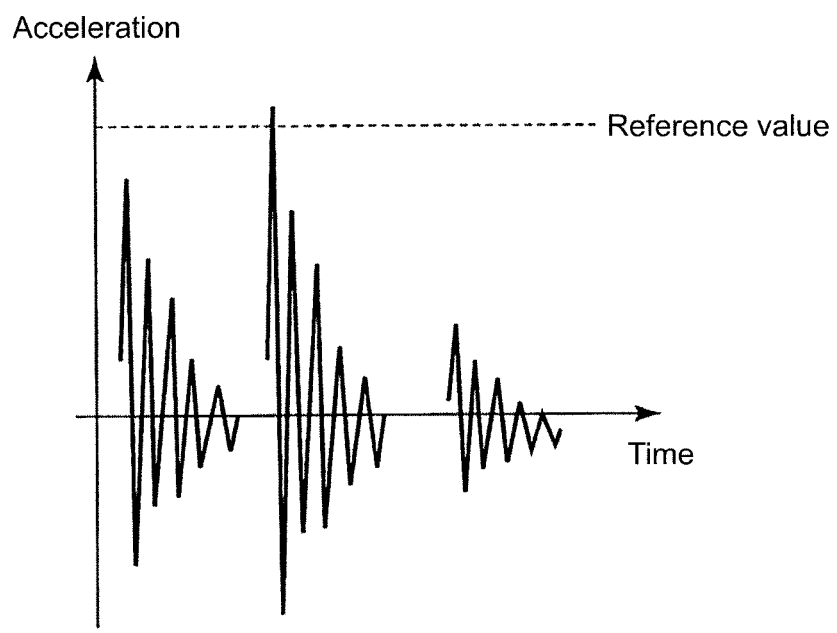
[FIG. 8B]

FIG. 8A is a graph schematically showing vibration data outputted by the acceleration sensor. The frequency filter 30 extracts only a component (the monitoring-object component) contained in the target frequency domain from the vibration data and outputs the component. FIG. 8B is a graph showing the monitoring-object component outputted by the frequency filter 30 and shows time on a horizontal axis and the amplitude of the acceleration on a vertical axis.

The determination unit 32 compares the amplitude of the acceleration with the reference value in the monitoring-object component. Then, in the present embodiment, the determination unit 32 counts the number of times that the amplitude of the acceleration exceeds the reference value over a period of one year and outputs the result as the annual cumulative frequency of the impact load.

According to the impact load monitoring system and the impact load monitoring method performed by the impact load monitoring system according to the first embodiment, it is possible to determine with a simple structure that the step-up gear 18 is subjected to the impact load in the case where the amplitude of the acceleration of the monitoring-object component exceeds the reference value. More specifically, when the wind moment Mw acts on the main shaft 20 due to wind turbulence such as wind shear and the impact load is applied on the step-up gear 18, the impact load can be detected.

Figure 9:
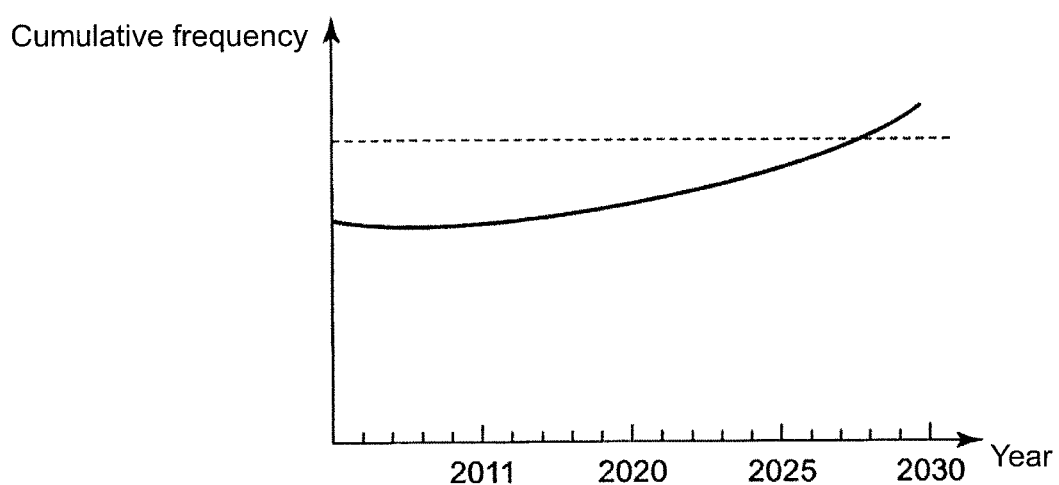
[FIG. 9]

Thus, an administrator of the wind turbine for wind power generation 10 can take appropriate actions in accordance with the determination result. For instance, when the annual cumulative frequency of the impact load exceeds a prescribed value as shown in FIG. 9, the administrator can anticipate damages in the step-up gear 18. Thus, the administrator, to prevent occurrence of damages, reduce the output of the wind turbine for wind power generation 10, thereby reducing the load on the step-up gear 18.

Second Embodiment

The impact load monitoring system of a second embodiment is explained in reference to drawings. The same reference numerals are given without adding explanations for those configurations that are the same or substantially the same as the first embodiment.

Figure 10:
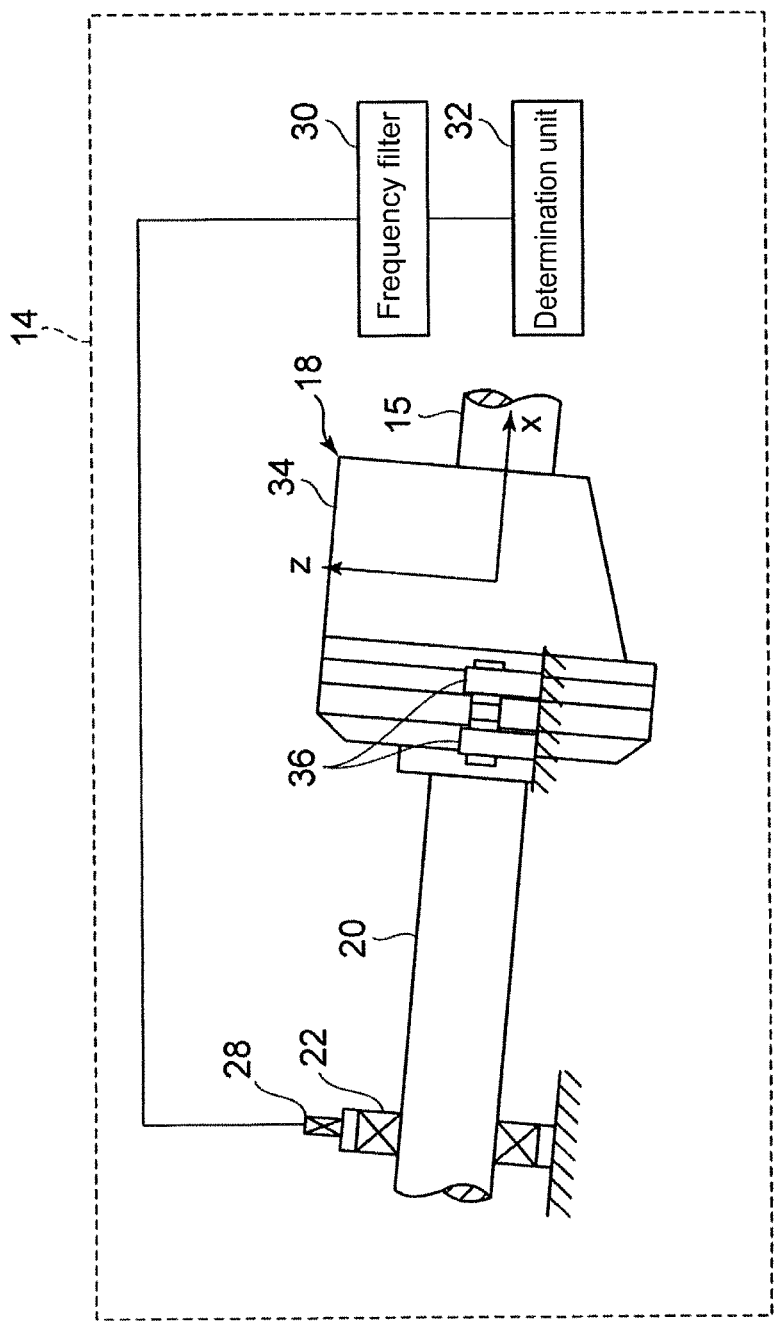
[FIG. 10]

The impact load monitoring system of the second embodiment is different from that of the first embodiment in that acceleration sensor 28 is attached to the main shaft 22 as shown in FIG. 10.

According to the impact load monitoring system of the second embodiment, it is possible to determine whether or not the impact load is applied with respect to the main bearing 22 and thus appropriate actions can be taken in accordance with the determination result.

While the embodiments of the present invention have been described, it is obvious to those skilled in the art that various changes may be made without departing from the scope of the invention.

For instance, in the first and second embodiments, the acceleration sensor 28 is attached to one of the step-up gear 28 or the main bearing 22 but the acceleration sensor 28 may be attached to both. The number of the acceleration sensor 28 is not limited to one.

Further, the acceleration sensor 28 may be attached to devices other than the main bearing 22 and the step-up gear 18 as long as it is a peripheral device around the main shaft 20, i.e. the device supporting the main shaft 20 or any device connected to the main shaft 22. For instance, in the case where the main shaft 20 is directly connected to the generator 16, the acceleration sensor 28 may be attached to the generator 16. In the case where the main shaft 20 is connected to the hydraulic pump, the acceleration sensor 28 may be attached to the hydraulic pump. Further, the step-up gear is not limited to the planetary gear mechanism and may be a hydraulic transmission.

Further, the impact load monitoring system of the first and second embodiments may be used in combination with the existing abnormality detecting apparatus using Fourier transformation. In other words, change in the natural frequency may be monitored at the same time.

Figure 11A:
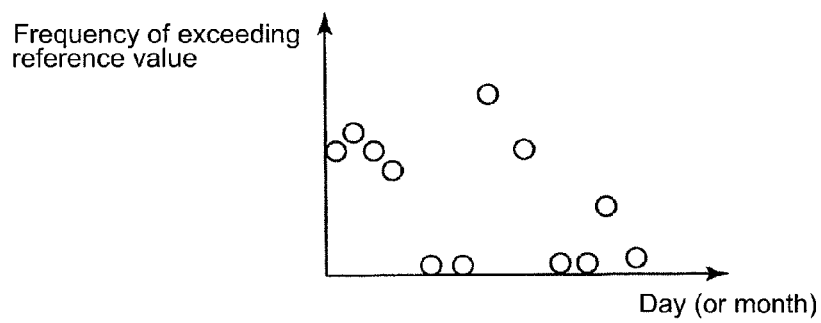
[FIG. 11A]
Figure 11B:
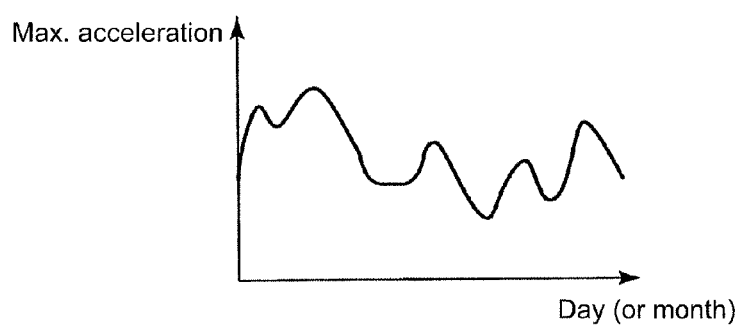
[FIG. 11B]

Further, in the first and second embodiments, the determination unit 32 may count the number of times when the amplitude of the acceleration exceeds the reference value every day or every month and outputs the result as a daily or monthly cumulative frequency as shown in FIG. 11A and FIG. 11B. More specifically, a period for counting the number of times the amplitude of the acceleration exceeds the reference value is not particularly limited. Alternatively, the number of times that the amplitude of the acceleration exceeds the reference value may be counted without limiting a period for counting and once the result (a total cumulative frequency) exceeds a reference number that is set in advance, a signal (an alarm) may be given to notify the total cumulative frequency has exceeded the reference value.

Meanwhile, the determination unit 32, as shown in FIG. 11B, may measure the maximum amplitude of the acceleration (the maximum acceleration) during the daily or monthly period and output time-series data of the measured maximum acceleration. Further, the determination unit 32 may measure the maximum amplitude of the acceleration (the maximum acceleration) during the period, e.g. every ten minutes, and output a spectrum of the monitoring-object component of the vibration data when the acceleration exceeds 1 G.

The invention claimed is:

1. An impact load monitoring system for a wind turbine for wind power generation, comprising:
    an acceleration sensor attached to a peripheral device around a main shaft of the wind turbine;
    a frequency filter electrically connected to the acceleration sensor, and extracting a monitoring-object component contained in a target frequency domain from vibration data obtained from the acceleration sensor, the vibration data representing a temporal change of amplitude of acceleration obtained by the acceleration sensor; and
    a determination unit electrically connected to the frequency filter, and determining whether or not the amplitude of the acceleration of the monitoring-object component exceeds a reference value which is set in advance, by comparing the amplitude of the acceleration with the reference value.

2. The impact load monitoring system for the wind turbine for wind power generation according to claim 1, wherein the target frequency domain includes a natural frequency of the peripheral device.

3. The impact load monitoring system for the wind turbine for wind power generation according to claim 2, wherein the target frequency domain is not greater than 200 Hz.

4. The impact load monitoring system for the wind turbine for wind power generation according to claim 3, wherein the acceleration sensor is attached to a step-up gear connected to the main shaft.

5. The impact load monitoring system for the wind turbine for wind power generation according to claim 4, wherein the acceleration sensor is attached to a main bearing supporting the main shaft.

6. The impact load monitoring system for the wind turbine for wind power generation according to claim 5, wherein the determination unit outputs a number of times that the amplitude of the acceleration exceeds the reference value.

7. The impact load monitoring system for the wind turbine for wind power generation according to claim 2, wherein the acceleration sensor is attached to a step-up gear connected to the main shaft.

8. The impact load monitoring system for the wind turbine for wind power generation according to claim 7, wherein the acceleration sensor is attached to a main bearing supporting the main shaft.

9. The impact load monitoring system for the wind turbine for wind power generation according to claim 8, wherein the determination unit outputs a number of times that the amplitude of the acceleration exceeds the reference value.

10. The impact load monitoring system for the wind turbine for wind power generation according to claim 2, wherein the acceleration sensor is attached to a main bearing supporting the main shaft.

11. The impact load monitoring system for the wind turbine for wind power generation according to claim 10, wherein the determination unit outputs a number of times that the amplitude of the acceleration exceeds the reference value.

12. The impact load monitoring system for the wind turbine for wind power generation according to claim 2, wherein the determination unit outputs a number of times that the amplitude of the acceleration exceeds the reference value.

13. The impact load monitoring system for the wind turbine for wind power generation according to claim 1, wherein the acceleration sensor detects vibration of the peripheral device including the temporal change of the vibration.

14. An impact load monitoring method for a wind turbine for wind power generation, the method comprising steps of:

attaching an acceleration sensor to a peripheral mechanism around a main shaft of the wind turbine;

extracting a monitoring-object component contained in a target frequency domain from vibration data obtained from the acceleration sensor, the vibration data representing a temporal change of amplitude of acceleration obtained by the acceleration sensor; and determining whether or not the amplitude of the acceleration of the monitoring-object component exceeds a reference value which is set in advance, by comparing the amplitude of the acceleration with the reference value.

15. An impact load monitoring system for a wind turbine for wind power generation, comprising:

an acceleration sensor attached to a peripheral device around a main shaft of the wind turbine;

a frequency filter electrically connected to the acceleration sensor, and extracting a monitoring-object component contained in a target frequency domain from vibration data obtained from the acceleration sensor, the vibration data representing a temporal change of amplitude of acceleration obtained by the acceleration sensor; and a determination unit electrically connected to the frequency filter and determining whether or not the amplitude of the acceleration of the monitoring-object component exceeds a reference value which is set so as to detect an impact load applied on the main shaft due to wind shear, by comparing the amplitude of the acceleration with the reference value.

16. The impact load monitoring system for the wind turbine for wind power generation according to claim 15, wherein the reference value is not less than 0.5 G.

17. The impact load monitoring system for the wind turbine for wind power generation according to claim 15, wherein the frequency filter removes a low frequency component and a high frequency component outside the target frequency domain of the monitoring-object component so that the frequency filter outputs only the monitoring-object component to the determination unit.

18. The impact load monitoring system for the wind turbine for wind power generation according to claim 17, wherein a vibration of the vibration data is based on a vibration of the main shaft.

* * * * *